(12) United States Patent
Stephen et al.

(10) Patent No.: US 10,530,114 B2
(45) Date of Patent: Jan. 7, 2020

(54) POLARIZATION MAINTAINING, LARGE MODE AREA (PMVLMA) ERBIUM-DOPED OPTICAL FIBER AND AMPLIFIER

(71) Applicant: United States of America as represented by the Administrator of NASA, Washington, DC (US)

(72) Inventors: Mark A. Stephen, Catonsville, MD (US); Anthony W. Yu, Spencerville, MD (US); Jeffrey W. Nicholson, Warren, NJ (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 308 days.

(21) Appl. No.: 15/691,904

(22) Filed: Aug. 31, 2017

(65) Prior Publication Data

US 2019/0067895 A1 Feb. 28, 2019

(51) Int. Cl.
| | | |
|---|---|---|
| H01S 3/067 | (2006.01) | |
| G02B 6/024 | (2006.01) | |
| H01S 3/16 | (2006.01) | |
| G02B 6/02 | (2006.01) | |
| H01S 3/0941 | (2006.01) | |
| H01S 3/094 | (2006.01) | |
| H01S 3/23 | (2006.01) | |

(52) U.S. Cl.
CPC ............ *H01S 3/0677* (2013.01); *G02B 6/024* (2013.01); *G02B 6/02009* (2013.01); *G02B 6/02052* (2013.01); *H01S 3/06712* (2013.01); *H01S 3/0941* (2013.01); *H01S 3/094046* (2013.01); *H01S 3/1608* (2013.01); *H01S 3/2391* (2013.01); *H01S 3/06729* (2013.01); *H01S 3/094003* (2013.01)

(58) Field of Classification Search
CPC ............... H01S 3/0677; H01S 3/06712; G02B 6/02009; G02B 6/024
See application file for complete search history.

(56) References Cited

U.S. PATENT DOCUMENTS

| | | | | |
|---|---|---|---|---|
| 2002/0172486 A1* | 11/2002 | Fermann | ............. | H01S 3/06708 385/128 |
| 2004/0156607 A1* | 8/2004 | Farroni | ............. | C03B 37/01217 385/123 |
| 2005/0008311 A1* | 1/2005 | Farroni | ............. | C03B 37/01217 385/123 |
| 2007/0177846 A1* | 8/2007 | Chen | ................. | C03B 37/01217 385/125 |
| 2009/0060435 A1* | 3/2009 | Chen | ...................... | G02B 6/024 385/123 |
| 2016/0274299 A1* | 9/2016 | Li | .......................... | G02B 6/024 |

* cited by examiner

*Primary Examiner* — Eric L Bolda
(74) *Attorney, Agent, or Firm* — Brian A. Geurts; Christopher O. Edwards

(57) ABSTRACT

The disclosed subject matter relates to a polarization-maintaining very large mode area (PM VLMA) Erbium-doped fiber and a polarization maintaining, Er-doped VLMA amplifier.

15 Claims, 14 Drawing Sheets

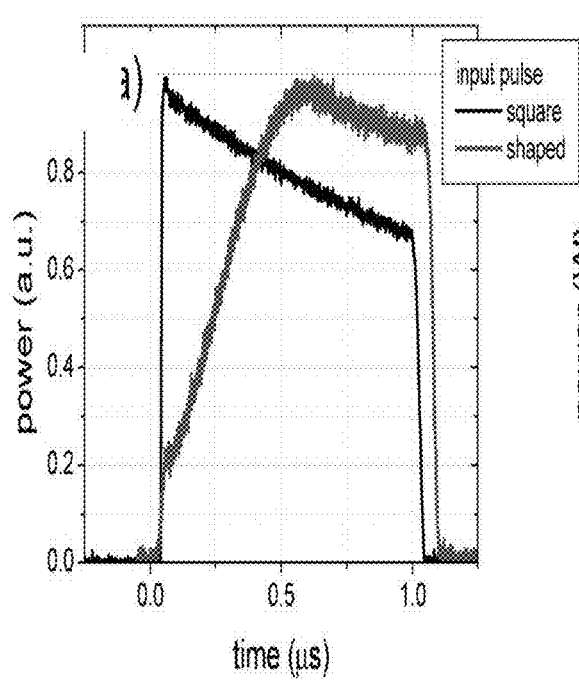
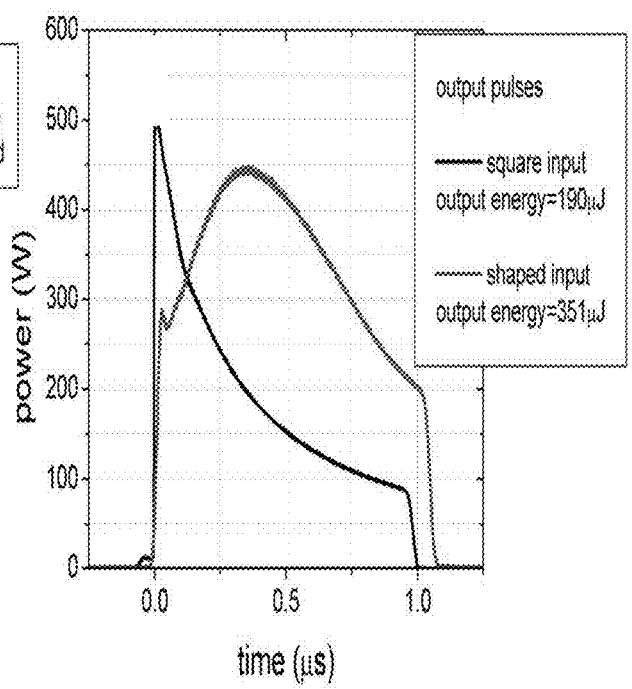
FIG. 9A
FIG. 9B

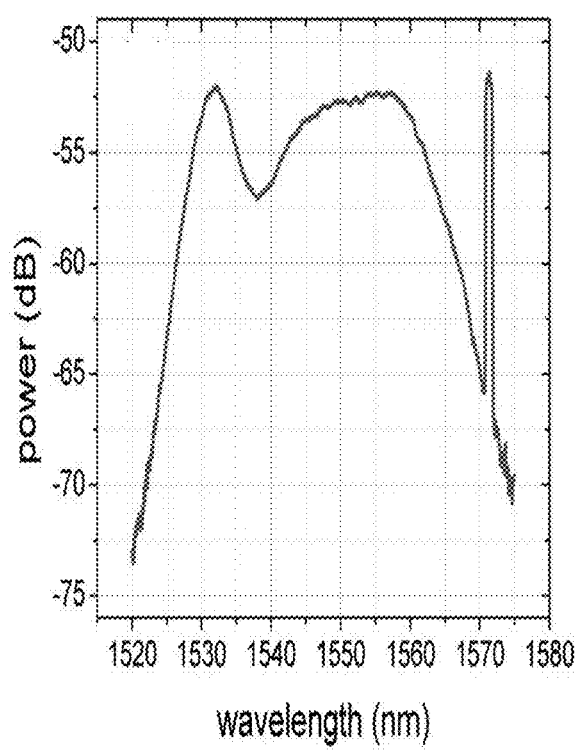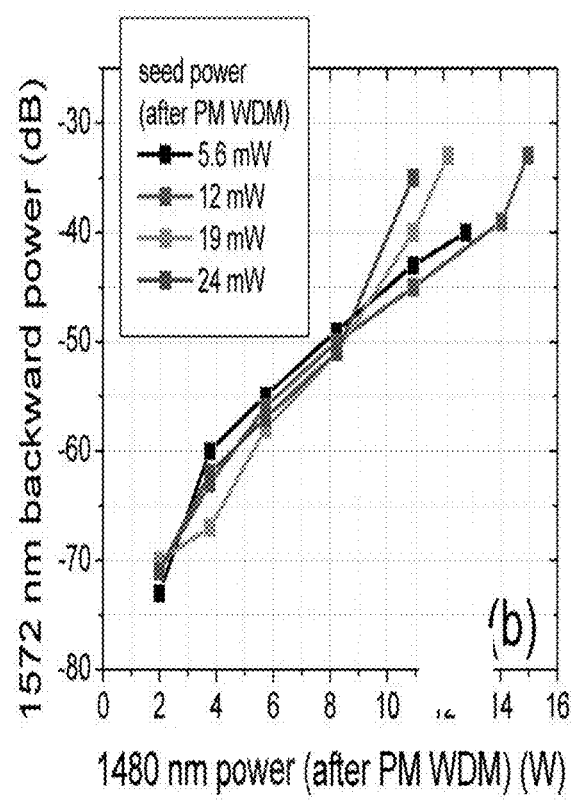
FIG. 10A                    FIG. 10B

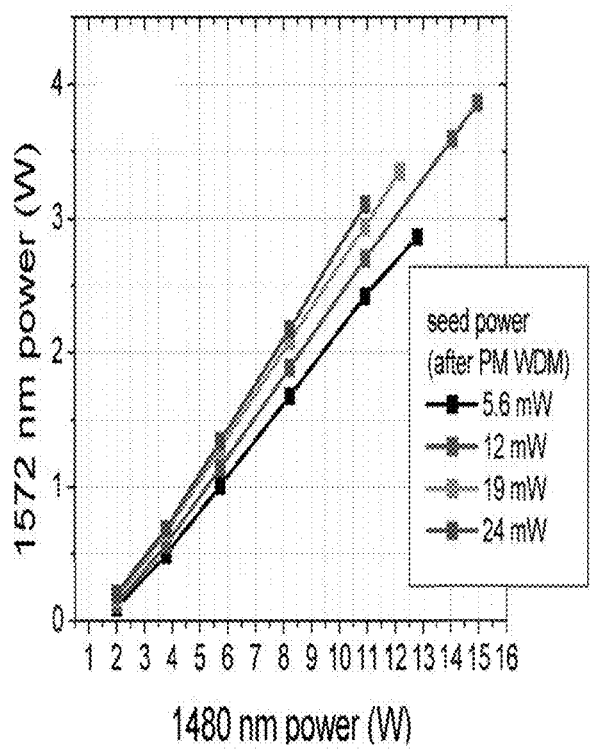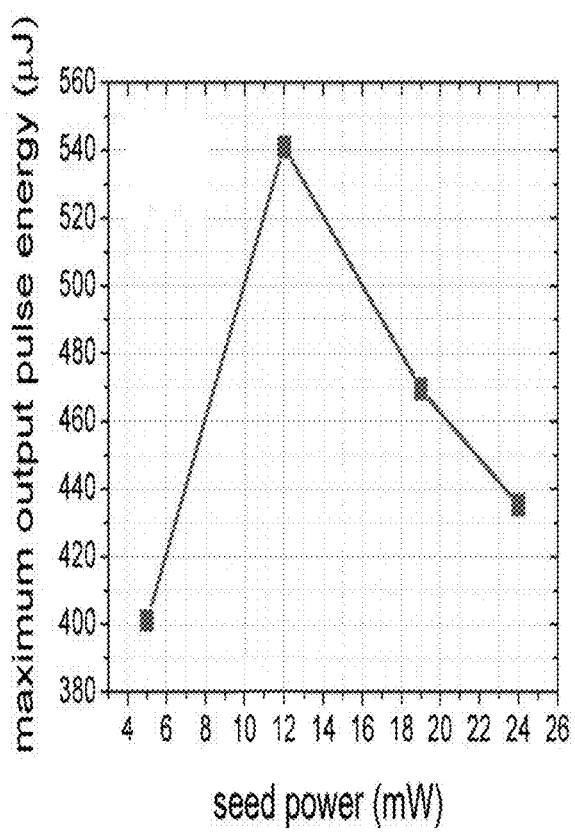
FIG. 11A
FIG. 11B

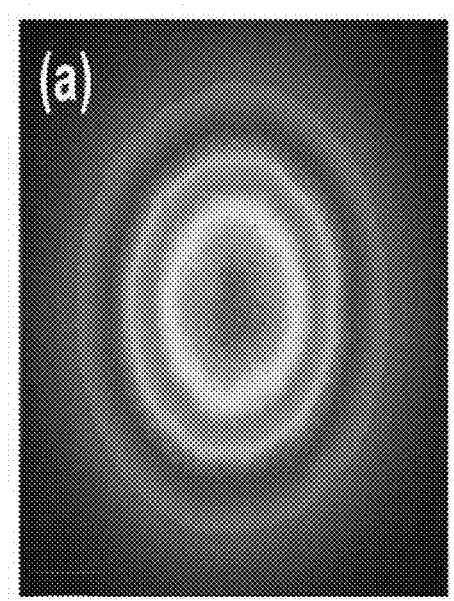
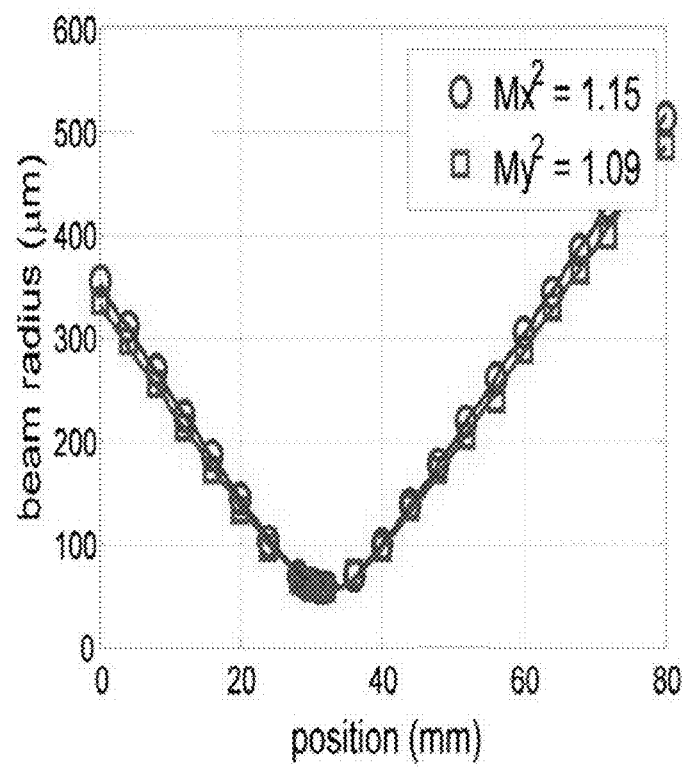
FIG. 14A
FIG. 14B

POLARIZATION MAINTAINING, LARGE MODE AREA (PMVLMA) ERBIUM-DOPED OPTICAL FIBER AND AMPLIFIER

FIELD OF THE INVENTION

This invention relates to erbium-doped optical fibers and amplifiers in which they are used.

BACKGROUND

The NASA ASCENDS (Active Sensing of $CO_2$ Emissions over Nights, Days, and Seasons) mission is developing a fiber-laser, space-based LIDAR (Light Detection and Ranging) system for $CO_2$ sensing. The $CO_2$ absorption line centered at 1572.335 nm was chosen due to a confluence of several spectroscopic properties. The $CO_2$ absorption line selected can be insensitive to temperature changes compared to other lines in the absorption band, free of absorption features from other atmospheric constituents, and have a convenient peak absorption amplitude that allows measurement of the full atmospheric column that optimizes the signal to noise ratio. The selected $CO_2$ absorption line does not saturate, but is a large enough feature that it is easy to distinguish from background variations.

Fiber-based laser technology has a number of advantages for space-based LIDAR systems, such as efficiency, weight, and providing robust, alignment-free operation. However, there are some operational challenges. These challenges include that the measurement system requires low-repetition-rate (7.5 kHz), single-frequency, high-energy (>500 μJ) pulses at a wavelength that is longer than has been utilized for high-energy Er-doped fiber amplifiers. Long wavelength operation can require corresponding long amplifiers and narrow-linewidth, high-energy pulses that can result in stimulated Brillouin scattering (SBS). It can also be important for the system to keep polarization-maintaining operation and diffraction-limited beam quality.

Er-doped fiber based sources of high-energy, narrow linewidth pulses in the 15xx wavelength range for LIDAR applications have been used. However, they may work at wavelengths closer to 1550 nm, too short for $CO_2$ detection, for example, 1.1 kW peak power at 1545 nm in a 108 ns pulse for a Yb-free Er fiber. Others may work at high pulse energies and peak powers, but the work is based on a multi-mode fiber and has poor M2. High aspect ratio, rectangular-core, Er-doped fibers produce very high pulse energies, but have not been demonstrated in an all-fiber format and the path to polarization maintaining operation is not clear. There is no polarization-maintaining demonstration for cladding-pumped, Yb-free Er fibers. A fiber laser for LIDAR using polarization-maintaining, commercial, off-the-shelf Er Yb fiber has a relatively small effective area of the core making peak power scaling difficult.

Very-large mode area, (VLMA) Er-doped fiber amplifiers, core pumped by highpower 1480 nm, Raman fiber lasers, generate diffraction limited, high energy pulses at 1.5 micron wavelengths, and have applications in femtosecond fiber chirp-pulse amplifiers and high-energy solution generation, for example, with core diameters greater than 50 microns and effective areas greater than 1100 $\mu m^2$. However, polarization-maintaining amplifiers with the performance needed for the $CO_2$ sensing application have not been demonstrated. Prior PM-VLMA fibers have suffered from difficulties with cleaving: the high stress used to increase birefringence to levels typical for PM fibers results in imperfections and surface distortion when the fibers are cleaved. This impairs fusion splicing, inhibiting robust all-fiber amplifier construction.

Polarization maintaining operation is important for many LIDAR systems, for example, the polarization extinction ratio was relatively poor in a multi-filament fiber with 37 Er Yb cores generated 940 W peak power with 1 MHz linewidth and an $M^2$ of 1.3 at 1545 nm where the fiber had stress rods for polarization maintaining operation.

BRIEF DESCRIPTION

In one embodiment, a polarization-maintaining very large mode area (PM VLMA) optical fiber is provided. The polarization-maintaining very large mode area (PM VLMA) optical fiber includes an optical core region having a longitudinal axis, the optical core region comprising a concentration of erbium and having a diameter of about 50 μm, at least one stress rod having a longitudinal axis, the longitudinal axis of the at least one stress rod being substantially parallel to the longitudinal axis of the core region; a cladding region surrounding the core region and the at least one stress rod, the core region, the at least one stress rod and the cladding region configured to support and guide the propagation of signal light and signal included therein in the direction of the longitudinal axis of the core region, wherein the optical fiber has a birefringence beat length of greater than about 14 mm.

In another embodiment, a polarization-maintaining very large mode area (PM VLMA) amplifier is provided. The polarization-maintaining very large mode area (PM VLMA) amplifier includes an optical fiber, a pump laser, a seed laser and a polarization-maintaining wavelength-division multiplexer. The optical fiber comprises an input end, an output end, an optical core region having a longitudinal axis, the optical core region comprising a concentration of erbium and having a diameter of about 50 μm, at least one stress rod having a longitudinal axis, the longitudinal axis of the at least one stress rod being substantially parallel to the longitudinal axis of the core region and a cladding region surrounding the core region and the at least one stress rod, the core region, the at least one stress rod and the cladding region configured to support and guide the propagation of signal light and signal included therein in the direction of the longitudinal axis of the core region, wherein the optical fiber has a birefringence beat length of greater than about 14 mm. The pump laser and the feed laser are connected to feed light into the multiplexer and the multiplexer connected to feed light into the input end of the optical fiber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9A is a graphical illustration of PM-VLMA input seed pulses of the embodiment of FIG. 4, time vs. power;

FIG. 9B is a graphical illustration of the PM-VLMA output pulses of the embodiment of FIG. 4, time vs. power;

FIG. 10A is a graphical illustration of backward propagating spectrum showing ASE and the 1572 nm Rayleigh scattered peak of the embodiment of FIG. 4, power vs. wavelength;

FIG. 10B is a graphical illustration of amplitude of the 1572 nm backward-propagating peak as a function of pump power and launched seed power;

FIG. 11A is a graphical illustration of amplifier performance vs. seed power for the 3.25 m long amplifier of the embodiment of FIG. 4, average output power vs. pump power and launched seed power FIG. 11B is a graphical illustration of amplifier performance vs. seed power for the 3.25 m long amplifier of the embodiment of FIG. 4, Maximum pulse energy;

FIG. 14A is the beam profile of the embodiment of FIG. 4;

FIG. 14B is a graphical illustration of the M2 at 3.5 W output power;

The patent or application file contains at least one drawing executed in color. Copies of this patent or patent application publication with color drawing(s) will be provided by the Office upon request and payment of the necessary fee.

DETAILED DESCRIPTION

In general, optical power in fibers is limited by the mode (core) area. When the core area is increased for power scaling, the spatial mode performance decreases. Additionally, as core area is increased, spatial mode quality becomes very sensitive to minor distortions of the fiber end facets, either at termination points or during assembly at fiber cleave locations. The present disclosure relates to providing an optical fiber including stress rods with polarization stabilization and still maintain high quality of spatial and polarization modes along the fiber and at end facets.

The present disclosure relates to a polarization-maintaining very large mode area (PM-VLMA) Erbium-doped fiber with greater than 350 $\mu m^2$, or preferably greater than about 800 $\mu m^2$ or more preferably greater than about 1000 $\mu m^2$ effective area and beat length greater than about 14 mm. The fiber enabled a polarization maintaining, Er-doped VLMA amplifier which demonstrated high-energy, one-microsecond pulse amplification at 1572.3 nm. Single frequency, 1572.3 nm, 1 µs pulses at 7.2 kHz repetition frequency were amplified to 700 W peak power with a pulse energy of 540 µJ. The polarization extinction ratio of the signal was better than 20 dB, and $M^2$=1.1 despite the relatively long fiber beat length. Such a PM-VLMA-Er amplifier is capable of meeting the optical requirements of space-based LIDAR (Light Detection and Ranging) system for $CO_2$ sensing for the NASA ASCENDS mission.

Figure 1:
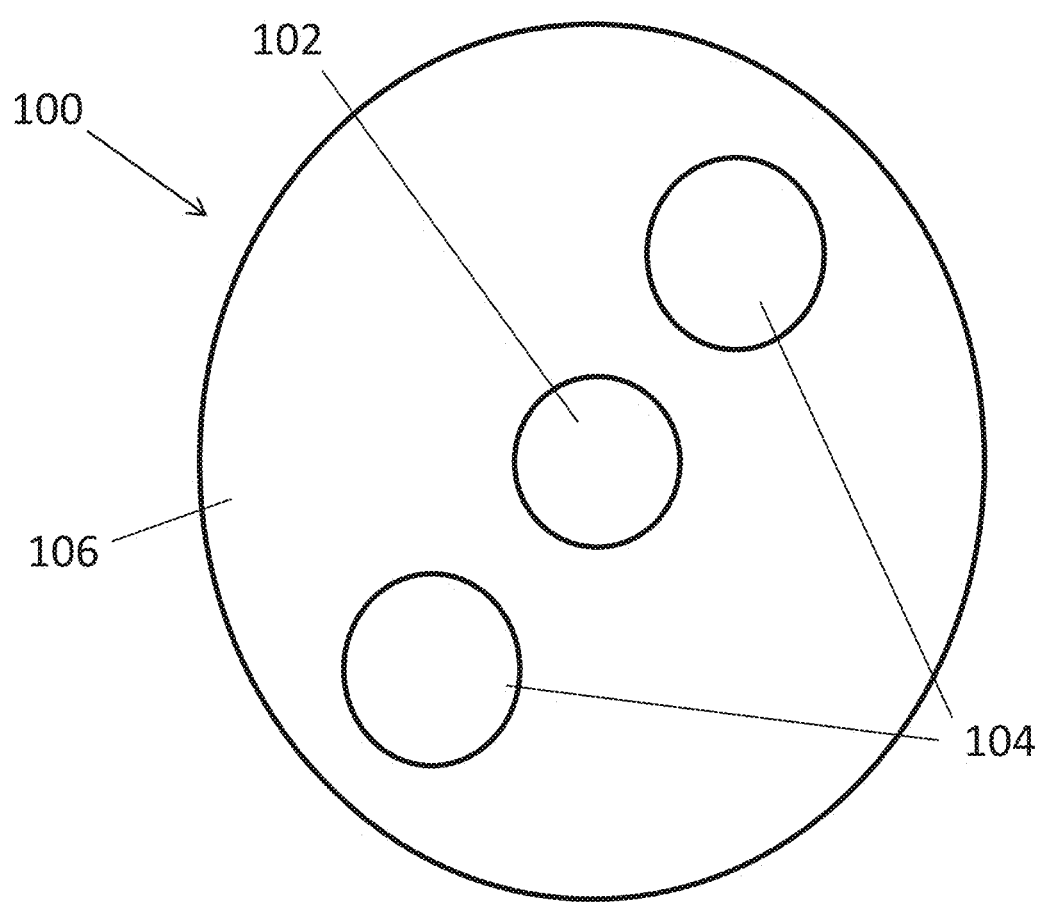
FIG. 1 is a schematic illustration of a cross section of one embodiment of a fiber optic article according to the present invention.

One embodiment of the fabricated PM-VLMA fiber utilized in the amplifier is shown in FIG. 1. The optical fiber 100 includes an optical core 102 with a diameter preferably about 50 µm. The optical core 102 is doped with erbium and has glass composition and refractive index characteristics which are well known in the art.

Stress rods 104 are included to induce birefringence. Stress rods may be a different kind of glass that adds stress to break the circular symmetry of the fiber cross-section. This creates a fast and slow axis of propagation through the fiber and makes linearly polarized light that is launched along one of these directions to stay in that polarization state. The stress rods may be positioned in close proximity to the optical core and made of material that exhibits a thermal expansion coefficient (TEC) markedly different from that of the optical core, such that stress is accumulated in the optical core as the PCF is drawn and such stress induces birefringence.

Typically, it is desirable to increase the amount of birefringence in the core, for example by reducing the spacing between the core and the stress rods. However, it has been found that high stress degrades the flatness of the cleaved facet, causing distortion of the optical field and increasing optical loss at fusion splices. This reduces amplifier performance and increases assembly time and cost. There is a tradeoff between high birefringence to improve the polarization holding capability of the fiber, and low birefringence to improve cleave facet quality.

In earlier PM-VLMA fiber designs, high birefringence sufficient to create beat length of about 8 mm was sufficient for excellent amplifier performance, but cleave facet quality was significantly degraded. It has been found that birefringence can be reduced and beat length increased to about 14 mm to produce excellent cleaved facet quality without significantly degrading amplifier performance. The diameter of stress rods 104 are preferably about 65 μm. The stress rods 104 can be composed of a suitable known optical material.

The optical core 102 and stress rods are surrounded by cladding 106. To confine the optical signal in the optical core 102, the refractive index of the optical core 102 should be greater than that of the cladding 106. The cladding 106 can be composed of a suitable optical material including, for example, pure silica.

The optical fiber 100 can be formed using known methods including the use of a preform and a conventional draw furnace to form the optical fiber.

An exemplified embodiment of the fabricated PM-VLMA Er fiber (the exemplified PM-VLMA Er-doped fiber) utilized in the amplifier described below is shown in FIG. 1 where the optical fiber 100 includes an optical core 102 with a diameter of about 50 μm composed of Al-doped silica with erbium in an amount sufficient to create a ground-state absorption level of about 50 dB/m at 1530 nm. Stress rods 104 are included, each with a diameter of about 65 μm composed of boron-doped silica. The cladding 106 is nominally pure silica.

The optical core of the exemplified embodiment has an erbium (Er) absorption of 50 dB/m at 1530 nm. The optical fiber of the exemplified embodiment was designed to have a birefringence beat length of 15.8 mm.

Figure 2:
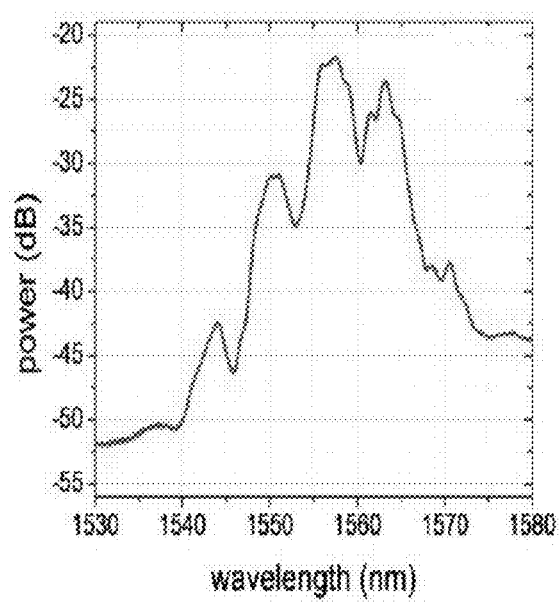
FIG. 2 is a graphical illustration of Measurement of the birefringence beat length via spectral beating of the polarization axes.
Figure 3:
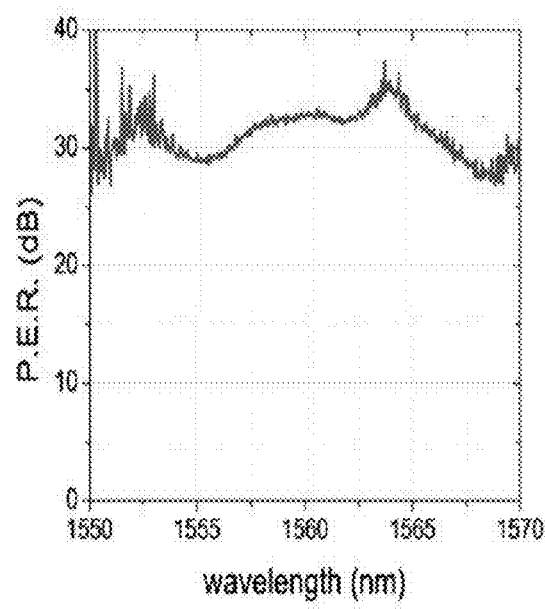
FIG. 3 is a graphical illustration of a low-power, polarization-extinction-ratio measurement with a broad-band source with the PM-VLMA fiber pumped to transparency.

The beat length of the exemplified embodiment was measured by measuring spectral interference caused by differential group delay between the polarization axes. The result of this measurement is shown in FIG. 2. The spectral fringe spacing was 7.3 nm for a 3 m length of fiber, corresponding to 14.1 mm birefringence beat length, close to the design target of 15.8 mm. The polarization extinction ratio (P.E.R.) of the 3 m length of fiber of the exemplified embodiment was measured by launching a polarized Er-ASE source and pumping the fiber to transparency. The results of this measurement, plotted in FIG. 3, include a low-power, polarization-extinction-ratio measurement with a broad-band source with the PM-VLMA fiber pumped to transparency and show that at low power, the P.E.R. of the fiber was >30 dB.

Figure 4:
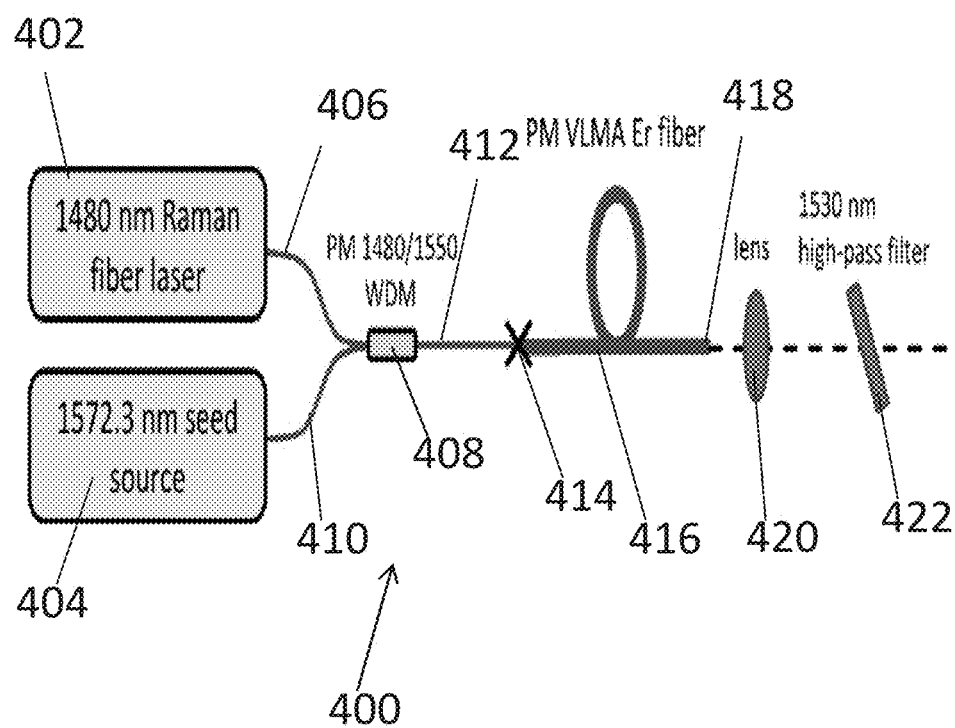
FIG. 4 is a schematic illustration of an embodiment of a PM-VLMA Er amplifier.

FIG. 4 shows an embodiment of a PM-VLMA Er amplifier 400 with a pump laser 402 that is, for example, a 1480 nm Raman fiber laser. A seed laser 404 may provide a 7.2 kHz pulse train at 1572.3 nm with 1 μs pulses. The Raman fiber pump laser 402 may producing up to 20 W output power at 1480 nm. The unpolarized Raman fiber laser output of the pump laser 402 is connected by an optical fiber 406 to a polarization-maintaining, fused-fiber, wavelength-division multiplexer 408. [FIG. 4 is mislabeled] The seed laser 404 output is connected by optical fiber 410 to the polarization-maintaining, fused-fiber, wavelength-division multiplexer (WDM) 408 as well. The output of the pump laser 402 is combined with the output of the polarized seed laser 404 via the polarization-maintaining, fused-fiber, wavelength-division multiplexer 408. The output of the fused-fiber WDM 408 via optical fiber 412 is then fusion spliced at 414 to the exemplified PM-VLMA Er-doped fiber 416. The output end 418 of the PM-VLMA Er amplifier is terminated with an 800 μm long coreless fiber that was angle polished at 8 degrees. The output of the amplifier is collimated with an 11 mm focal length lens 420. A 1530 nm high-pass filter 422 is used to transmit the signal and reject unabsorbed 1480 nm pump and residual short-wavelength Stokes lines from the Raman laser.

Figure 5:
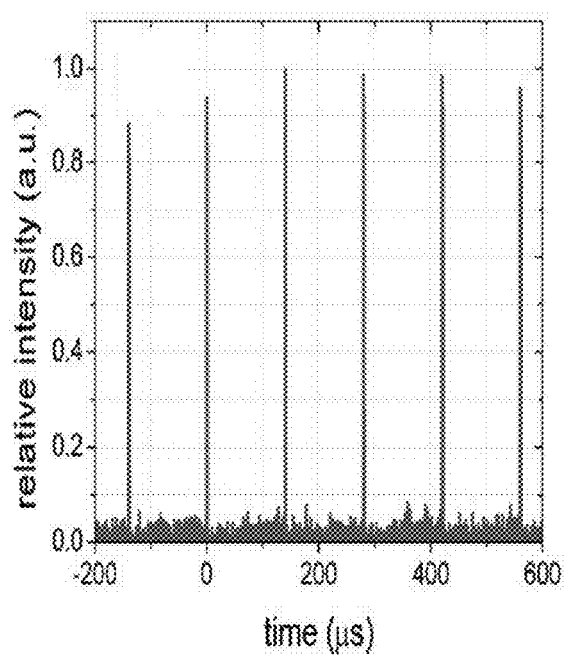
FIG. 5 is a graphical illustration of 7.2 kHz, 1 ms pulse train at 1572.3 nm, relative intensity vs. time.

To generate the seed laser pulse train for the embodiment of FIG. 4, an external-cavity diode laser with linewidth of approximately 400 kHz was amplified, and modulated with an electro-optic modulator can be used to produce a 500 kHz pulse train with 1 μs pulses. A function generator driving the electrooptic modulator may provide some limited functionality for shaping the rising edge of the μs pulses. The pulses can be then amplified again, before stepping down the pulse repetition rate to 7.2 kHz using an acousto-optic modulator (AOM). After the AOM, a final pre-amplifier stage can be used to boost the average power to a maximum of 30 mW. Additionally a bandpass filter at 1572.3 nm can be included after the final pre-amplifier to reduce out-of-band ASE. The fibers in the seed laser system can be non-polarization maintaining, so a polarization controller and in-line fiber polarizer can be added after the 1572.3 nm band-pass filter, before launching the pulses into the PM-WDM, which had polarization maintaining fiber pigtails. FIG. 5 shows at 7.2 kHz, a 1 ms pulse train at 1572.3 nmas discussed above.

Figure 6:
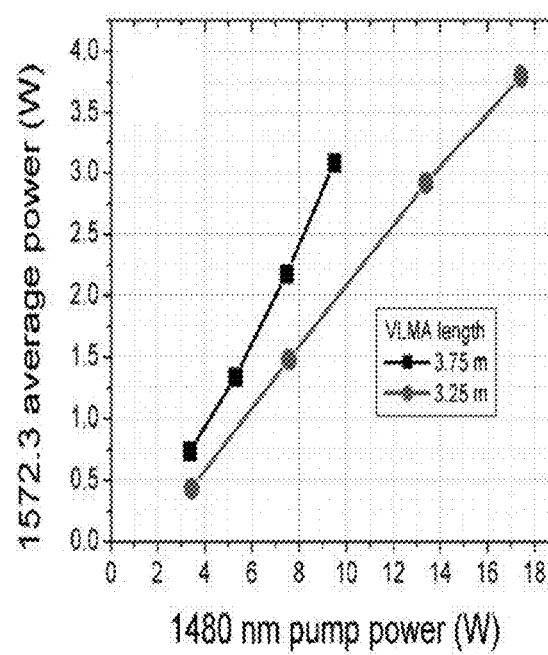
FIG. 6 is a graphical illustration of the average output power vs. pump power for a 3.75 m long amplifier compared to a 3.25 m long amplifier of the embodiment of FIG. 4.

Output power vs. pump power for two different fiber lengths of 3.75 m and 3.25 m of the embodiment of FIG. 4 including the seed laser in the previous paragraph are shown in FIG. 6. Because of the operating wavelength of 1572.3 nm, a longer fiber length was used than is the typical value of 2.5 to 2.7 m when operating at 1550 nm. While the longer fiber length provided higher slope efficiency, the shorter fiber length enabled higher average powers due to the higher threshold for the onset of stimulated Brillouin scattering. Details on the measurement of SBS are given below.

Figure 7:
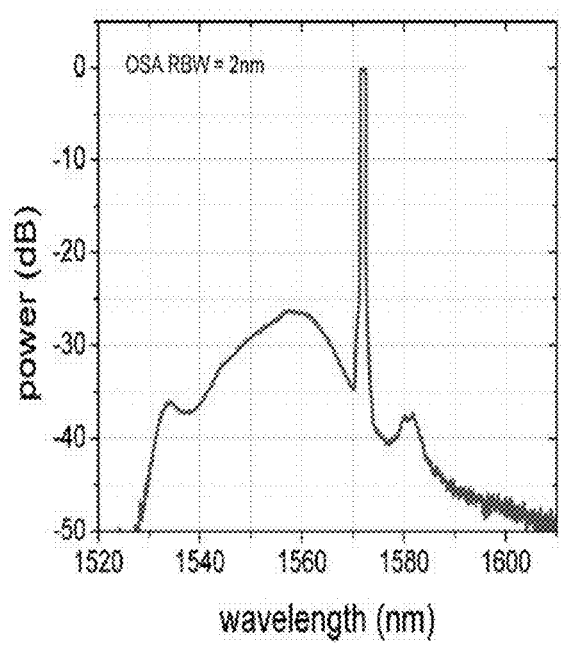
FIG. 7 is a graphical illustration of the Optical spectrum (OSA resolution bandwidth=2 nm), power vs. wavelength of the embodiment of FIG. 4.
Figure 8:
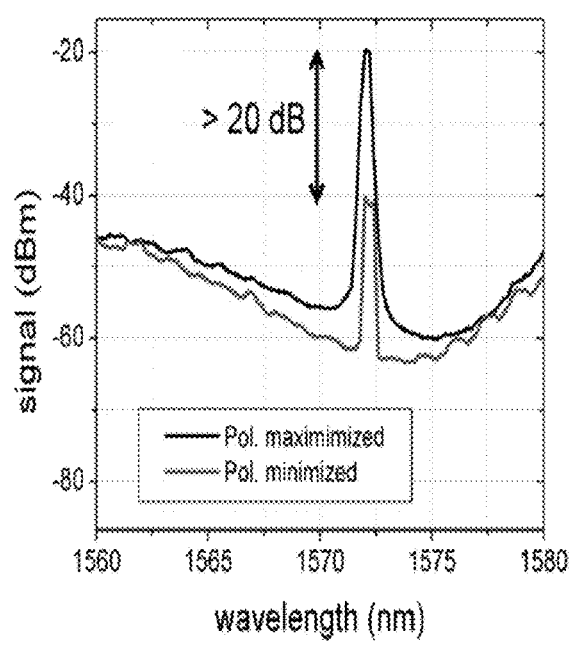
FIG. 8 is a graphical illustration of P.E.R. measurement in the 3.25 m amplifier fiber of the embodiment of FIG. 4 at 3.5 W output power, signal vs. wavelength.

The optical spectrum at 3.5 W output power from the 3.25 m amplifier fiber is shown in FIG. 7. The measurement of P.E.R. at this output power is shown in FIG. 8. While the amplified spontaneous emission (ASE) was largely unpolarized, the polarization of the signal at 1572.3 nm was >20 dB.

When amplifying high-energy, long pulses in a fiber amplifier, shaping of the input pulses is critical to counter gain-induced pulse steepening. This effect is illustrated in FIG. 9 for the PM-VLMA Er amplifier of FIG. 4. FIG. 9 shows input seed pulses (FIG. 9A) compared to output amplified pulses (FIG. 9B) for square pulses compared to pulses with a rising edge. In FIG. 9A, the square pulses generated by the electro-optic modulator undergo some amount of steepening in the pre-amplifiers following the modulator. This steepening is increased dramatically in the PM-VLMA amplifier fiber, limiting the achievable pulse energy due to nonlinearities caused by the sharp leading peak. By pre-shaping the pulses, the gain-induced steepening can be counteracted, and as a result, for a given output peak power, the achievable pulse energy depends on the quality of the pre-shaping. For these experiments, the shaping was relatively limited due to the function generator used to drive the EOM. Pulse temporal waveforms were measured using a photodiode with 100 ps rise-time together with an HP86100A sampling oscilloscope with 50 GHz bandwidth.

Using the shaped input pulses, stimulated Brillouin scattering (SBS) from the PM-VLMA amplifier of FIG. 4 was then characterized (FIG. 10). The backward propagating optical spectrum is illustrated in FIG. 10A showing the backward ASE, as well as the Rayleigh scattered 1572.3 nm peak. Most of the backward propagating power was contained in ASE. To monitor for the onset of SBS, the amplitude of the 1572.3 nm peak was monitored in the optical spectrum analyzer. The amplitude of this peak as a function of 1480 nm pump power and launch seed power is shown in FIG. 10B. For seed powers greater than 12 mW, there is an increase in the slope of the 1572.3 nm peak at high pump powers, indicating the onset of SBS. The amplifier output power was not increased beyond the point at which the slope of the backward 1572.3 nm was observed to increase. In contrast, for a seed power of 5.6 mW, the increase in backward 1572.3 nm was not observed and SBS was not the limiting factor. Rather, the limitation was sporadic lasing of the backward ASE, which occurred at a pump power of approximately 13 W.

Figure 11C:
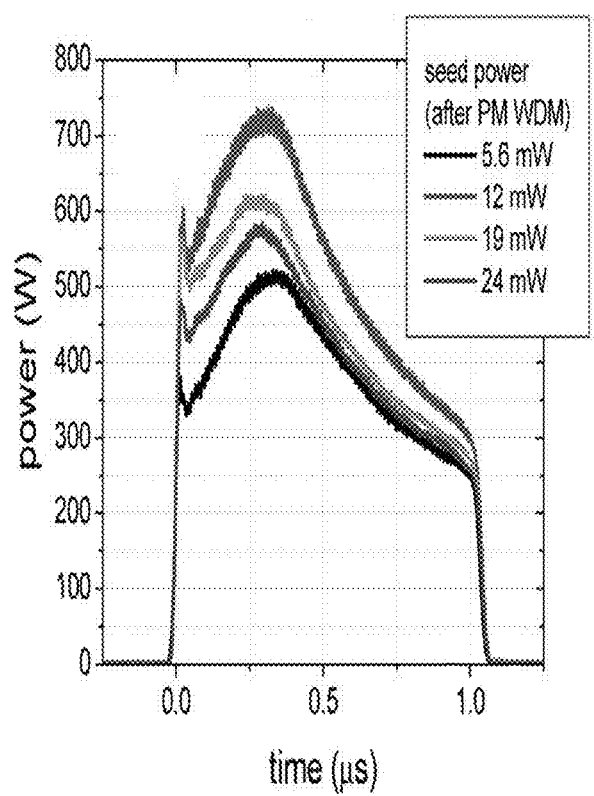
FIG. 11C is a graphical illustration of amplifier performance vs. seed power for the 3.25 m long amplifier of the embodiment of FIG. 4, pulse profile for maximum pulse energy vs. seed power.
Figure 11D:
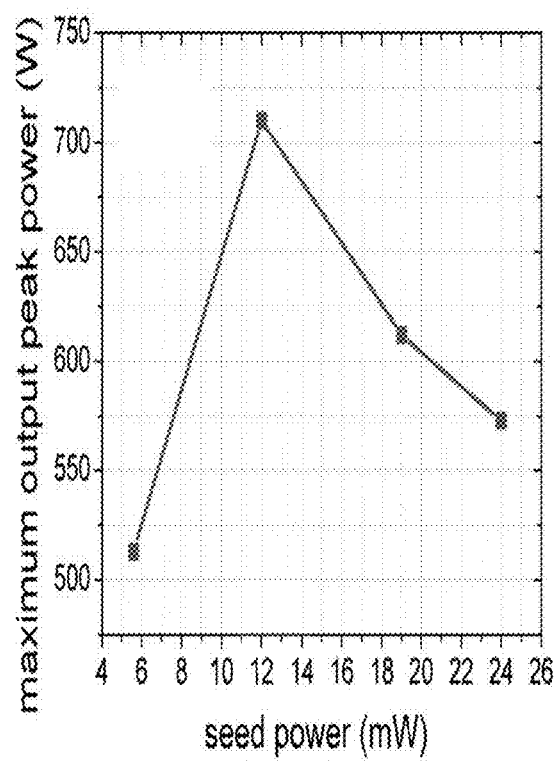
FIG. 11D is a graphical illustration of amplifier performance vs. seed power for the 3.25 m long amplifier of the embodiment of FIG. 4, maximum peak power vs. seed power.

Pulsed performance vs. seed power for the 3.25 m long amplifier of FIG. 4 is shown in FIG. 11. Output power vs. pump power as a function of seed power is given in FIG. 11A. Slope efficiency increases with increasing seed power, but the SBS threshold decreases, limiting achievable pulse energy at higher seed powers. As discussed above, at 5.6 mW seed power, the output power was limited by backward lasing of the 1550 nm ASE. The temporal profile of the pulses for different seed power at maximum output power is shown in FIG. 11C. The maximum pulse energy and maximum peak power vs. seed power are plotted in FIG. 11B and FIG. 11D, respectively. The maximum pulse energy was 540 μJ and the peak power was 700 W, for a seed power of 12 mW. Although some pre-shaping of the pulse was utilized by adjusting the leading edge of the seed pulse, as discussed above, the output pulses still displayed a relatively large peak, as evidenced in FIG. 11C. This peak in turn led to high peak powers, limiting the pulse energy. Potentially with better pulse shaping, significantly higher pulse energy could be obtained for the same peak power and level of SBS. For example, a 1 μs square pulse with 700 W peak power would have 700 μJ pulse energy.

Because of the low rep-rate of the pulse train, it is necessary to measure the fraction of total output power that is contained in the pulse (the pulse extinction ratio). For this experiment, the set-up shown in FIG. 12 was used. The output of the PM-VLMA amplifier 1200 was coupled into an acousto-optic modulator (AOM) 1202 using for example, lenses 1204 and 1206. The PM-VLMA amplifier 1200 is similar to the embodiment in FIG. 4. The output of the AOM1202 was split using a beam splitter 1208 between a power meter 1210 and an optical spectrum analyzer 1212. The AOM 1202 was used to select a time-slot corresponding to the pulse, or the time in-between pulses.

Figure 12:
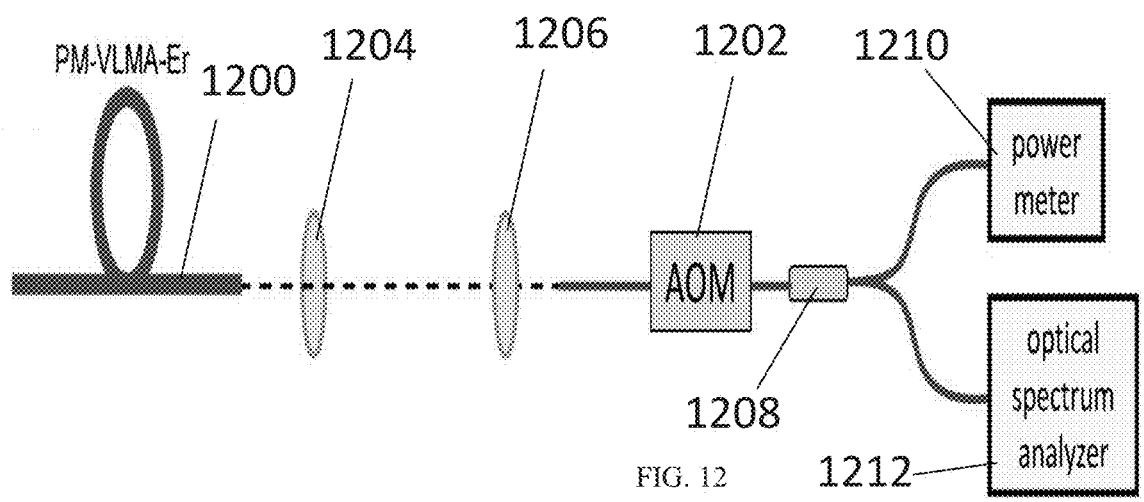
FIG. 12 is a schematic illustration of a set-up for measuring fraction of output power in the pulse of the embodiment of FIG. 4.
Figure 13A:
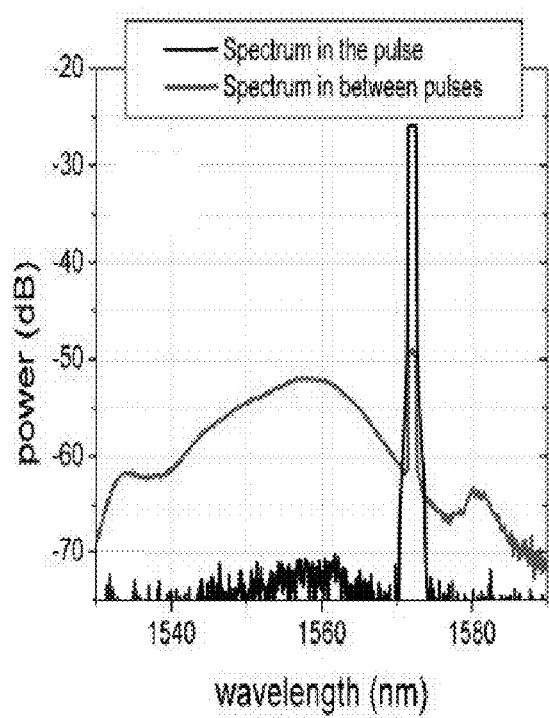
FIG. 13A is a graphical illustration of the optical spectrum in the pulse of the embodiment of FIG. 4, compared to spectrum in-between pulses.
Figure 13B:
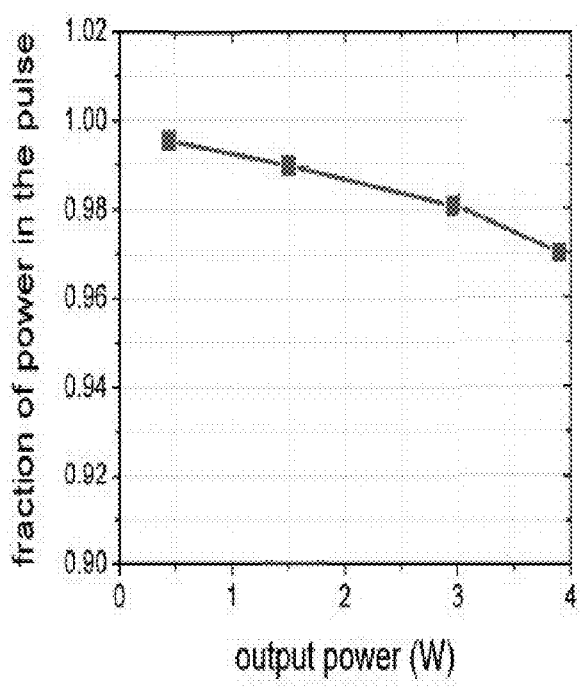
FIG. 13B is a graphical illustration of the optical spectrum in the pulse of the embodiment of FIG. 4 the fraction of power in the pulse, vs. output power.

Using the set-up in FIG. 12, the spectrum measured in the pulse, compared to the spectrum in-between pulses is plotted in FIG. 13A. From this result it is clear that the ASE builds up in-between pulses, and the optical signal to noise ratio, OSNR, of the optical spectrum is a good measure of the pulse extinction. Alternatively, we measured the pulse extinction ratio directly with the power meter after the AOM. We calculated the pulse extinction both from the OSNR of the optical spectrum and directly from the power meter measurement. The two results agreed reasonably well. The average of the two measurement techniques is shown in FIG. 13B. For approximately 3.8 W of output power, 97% of the power was contained in the pulse, showing high purity of the pulse train, in spite of the low repetition rate.

Finally, the beam profile (FIG. 14A) and M2 (FIG. 14B) were measured at maximum output power also using the set-up of FIG. 12. M2 was measured with a commercial device based on a rotating slit (Thorlabs M2 measurement system). The M2 measurement was made with a CW seed laser, as the M2 measurement device did not operate with low rep-rate pulse lasers. Minimal significant beam changes were observed when switching from CW to pulsed operation. Furthermore, S2 imaging measurements were made to quantify the residual higher-order mode content in the amplifier. Residual higher-order mode content was found to be very low, with approximately 3% to 4% of the output power contained in the LP11 mode.

Figure 15:
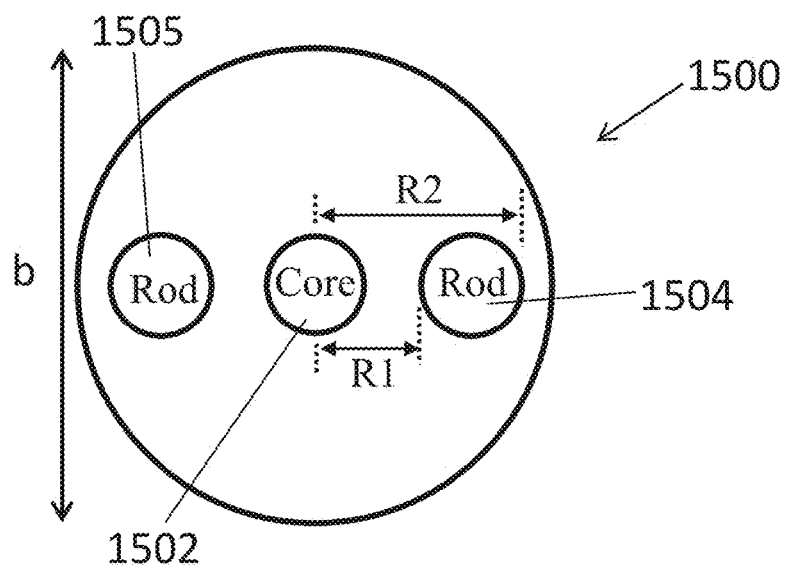
FIG. 15 is a schematic illustration of a cross section of an embodiment of a fiber optic article according to the present invention.
Figure 18:
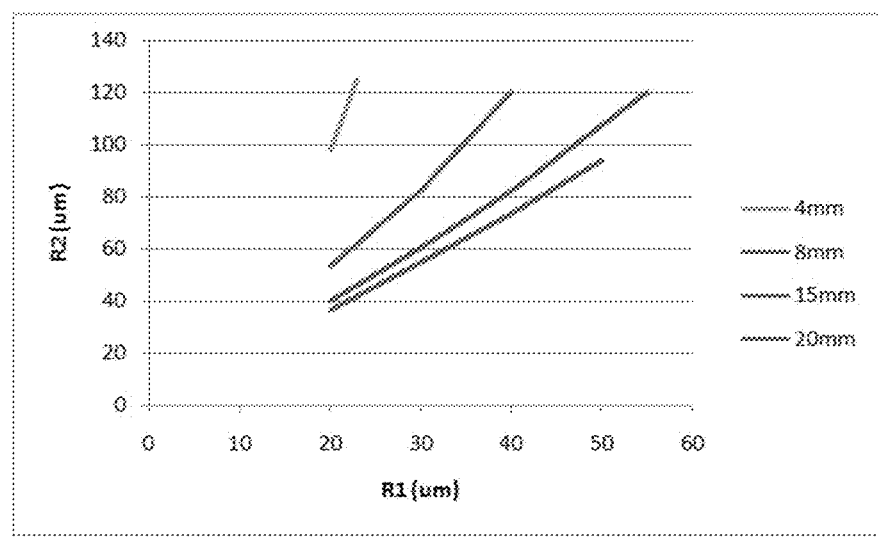
FIG. 18 illustrates combinations of R1 and R2 to achieve beat lengths of 4 mm, 8 mm, 15 mm and 20 mm for a 330 um diameter fiber using the equations in paragraph [0057].

FIG. 15 includes an embodiment optical fiber 1500 including an optical core 1502 and stress rods 1504 and 1505. The radius of optical core 1502 is about 25 μm. Optical fiber 1500 has a diameter "b" which in this embodiment is about 330 μm. "R1" is the shortest distance between the center of optical core 1502 and the exterior of stress rod 1504 and "R2" is the longest distance between the center of optical core 1502 and the exterior of stress rod 1504. "R1" and "R2" are approximately the same between optical core 1502 and stress rod 1505 as they are between optical core 1502 and stress rod 1504. Round stress rods are shown in FIG. 15, but other shapes may be used, such as so-called "D-shaped", elliptical or "bow-tie" stress rods. Birefringence beat length ($L_{beat}=\lambda/B$) is calculated using the following formula:

$$B = 4B_m\left(\frac{R2-R1}{R2+R1}\right)^2\left\{1-\frac{3}{16}\frac{(R2+R1)^4}{(b/2)^4}\right\}$$

where $$B_m = \frac{\Delta\alpha\Delta TEC}{2(1-v)}$$

and B=birefringence ($n_x-n_y$), λ=wavelength, C=photoelastic constant, Δα=difference in thermal expansion, ΔT=temperature change during fiber cooling, v=Poisson's ratio, E=Young's modulus andb=fiber diameter. In anexemplified embodiment where fiber outside diameter (OD in μm) is 330, R1 (μm) is 55, R2 (μm) is 120 and the stress rod dimension (DROD in μm) is 65, the Beat length (mm) is 15.8. In a comparison example, where fiber OD (μm) is 330, R1 (μm) is 40, R2 (μm) is 120 and DROD (μm) is 80, the Beat length (mm) is 8.0. It is important to have a high P.E.R., but where there is a short birefringence beat length (as in the comparison example), large stress rods very close to the optical core can cause distortions to the core geometry and make cleaving difficult. The above equations may be used to determine the design parametersto achieve particular a beat length. For example, FIG. 18 shows combinations of R1 and R2 to achieve beat lengths of 4 mm, 8 mm, 15 mm and 20 mm for a 330 μm diameter fiber. Preferred values of R1 and R2 are indicated by the ranges shown in FIG. 18, combined with specific values calculated from the above equations.

Figure 16:
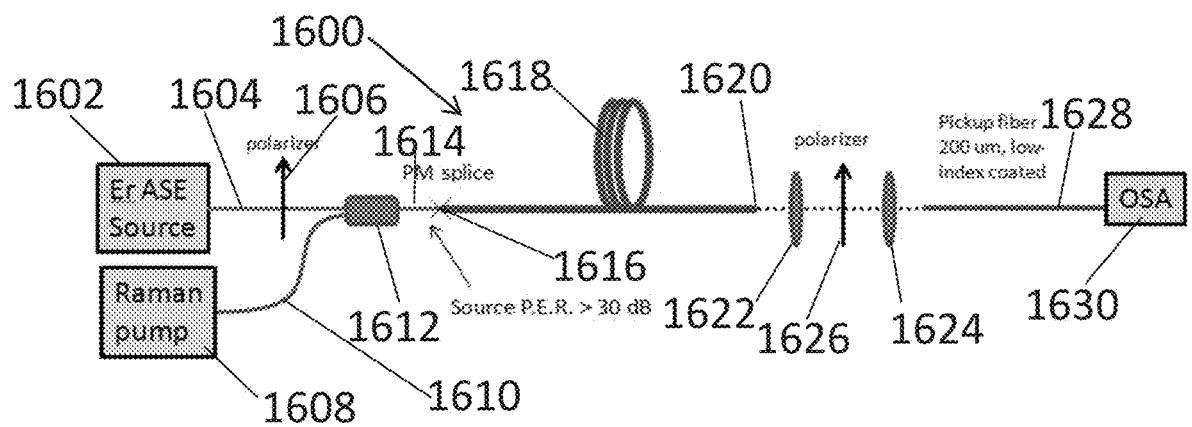
FIG. 16 is a schematic illustration of a test set-up for measuring birefringence beat length.
Figure 17:
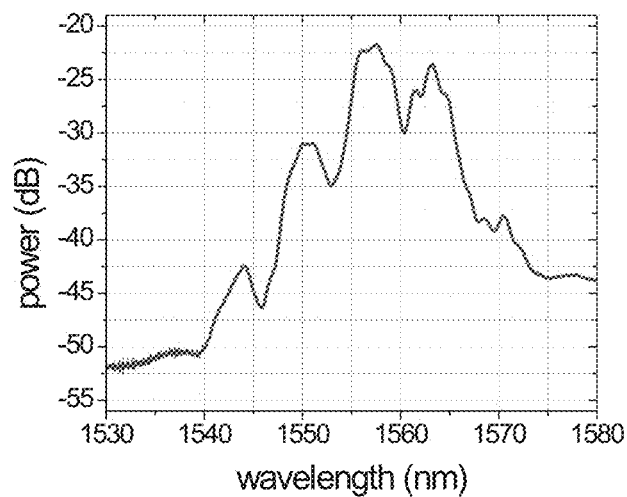
FIG. 17 is a graphical illustration of wavelength versus power for test set-up of FIG. 16.

The birefringence beat length of the exemplified embodiment and the comparison example were measured using test set-up 1600 in FIG. 16 that includes an Er ASE source 1602 that is connected by an optical fiber 1604, the latter passing through a polarizer 1606, where the source P.E.R. is greater than 30 dB. A Raman pump 1608 is connected to an optical fiber 1610. Optical fibers 1604 and 1610 are connected to a polarization-maintaining, fused-fiber, wavelength-division multiplexer (WDM) 1612 as well. The output of the Raman pump 1608 is combined with the output of the polarized Er ASE source 1602 via the polarization-maintaining, fused-fiber, wavelength-division multiplexer 1612. The output of the fused-fiber WDM 1612 via optical fiber 1614 is then fusion PM spliced at 1616 to the optical fiber 1618 to be tested (the above exemplified embodiment or the above comparison example). The output end 1620 of the optical fiber 1618 passes through lenses 1622 and 1624 with polarizer 1626 therebetween. The output of lens 1624 then passes through a 200 μm, low-index coated pickup fiber 1628 to an optical spectrum analyzer 1630. FIG. 17 plots the wavelength (nm) versus the power (dB) for test set-up 1600. Test set-up 1600 measured the birefringence beat length measured via spectral interferometry. The measured birefringence beat length of the exemplified embodiment was 14.1 mm (the design target being 15.8 mm). The measured birefringence beat length of the comparison example was 7.1 mm (the design target being 8 mm).

In comparing the exemplified embodiment and the comparison example, the stress rod separation was increased and rod diameter was decreased. This reduced the stress in the vicinity of the core, allowing better (flatter) cleaves. The lower stress reduced the birefringence, but amplifier testing showed that this was acceptable. The present invention can be defined as an optimum between contradictory trends: tight stress rod spacing increases core stress and birefringence and beneficially increases the polarization holding properties, but the quality of the cleave is degraded. Reducing stress degrades the polarization properties but improves the cleave. There is, thus, a design space where both properties are adequate for high performance amplifier operation.

In conclusion, the above embodiments show a polarization-maintaining, very-large mode area, Er-doped fiber with effective area of 1100 µm2. Using the exemplified PM-VLMA Er-doped fiber, there is an amplification of single-frequency, 1 µs pulses in a 7.2 kHz pulse train at 1572 nm. 540 µJ pulses with 700 W peak power. With further improvements in pre-shaping of the input pulses, there may be increases in output pulse energy. The output pulses had a polarization extinction ratio of >20 dB, a diffraction limited beam with M2<1.2 and 97% of the output power contained in the signal pulse. The optical performance demonstrated with the PM-VLMA Er amplifier of FIG. 4 meets the requirements of the NASA ASCENDS mission for $CO_2$ sensing.

Other potential applications of the present invention could include micromachining with nanosecond pulses with high peak power, in the range of 100 kW or more and as a femtosecond chirp-pulse amplifier fiber laser systems for scientific and bio-imaging applications.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A polarization-maintaining very large mode area (PM VLMA) optical fiber, comprising
   a. an optical core region having a longitudinal axis, the optical core region comprising a concentration of erbium and having a diameter of about 50 µm;
   b. at least one stress rod having a longitudinal axis, the longitudinal axis of the at least one stress rod being substantially parallel to the longitudinal axis of the core region; and
   c. a cladding region surrounding the core region and the at least one stress rod,
      the core region, the at least one stress rod and the cladding region configured to support and guide the propagation of signal light and signal included therein in the direction of the longitudinal axis of the core region,
      wherein the optical fiber has a birefringence beat length of greater than about 14 mm.

2. The polarization-maintaining very large mode area (PM VLMA) optical fiber of claim 1, wherein the thermal expansion coefficient of the optical core region is different from the thermal expansion coefficient of the at least one stress rod.

3. The polarization-maintaining very large mode area (PM VLMA) optical fiber of claim 1, including two stress rods.

4. The polarization-maintaining very large mode area (PM VLMA) optical fiber of claim 3, wherein the optical core and two stress rods are substantially aligned along a diameter axis of the optical fiber.

5. The polarization-maintaining very large mode area (PM VLMA) optical fiber of claim 1, wherein the optical core has an erbium absorption of 50 dB/m at 1530 nm.

6. The polarization-maintaining very large mode area (PM VLMA) optical fiber of claim 1, wherein the optical fiber includes an effective area of about 1100 µm$^2$.

7. A polarization-maintaining very large mode area (PM VLMA) amplifier, comprising
   a. an optical fiber comprising
      i. an input end;
      ii. an output end;
      iii. an optical core region having a longitudinal axis, the optical core region comprising a concentration of erbium and having a diameter of about 50 µm;
      iv. at least one stress rod having a longitudinal axis, the longitudinal axis of the at least one stress rod being substantially parallel to the longitudinal axis of the core region; and
      v. a cladding region surrounding the core region and the at least one stress rod,
         the core region, the at least one stress rod and the cladding region configured to support and guide the propagation of signal light and signal included therein in the direction of the longitudinal axis of the core region,
         wherein the optical fiber has a birefringence beat length of greater than about 14 mm;
   b. a pump laser;
   c. a seed laser; and
   d. a polarization-maintaining wavelength-division multiplexer, said pump laser and said feed laser connected to feed light into the multiplexer and the multiplexer connected to feed light into the input end of the optical fiber.

8. The polarization-maintaining very large mode area (PM VLMA) amplifier of claim 7, wherein the thermal expansion coefficient of the optical core region is different from the thermal expansion coefficient of the at least one stress rod.

9. The polarization-maintaining very large mode area (PM VLMA) amplifier of claim 8, including two stress rods.

10. The polarization-maintaining very large mode area (PM VLMA) amplifier of claim 9, wherein the optical core and two stress rods are substantially aligned along a diameter axis of the optical fiber.

11. The polarization-maintaining very large mode area (PM VLMA) amplifier of claim 8, wherein the optical core has an erbium absorption of 50 dB/m at 1530 nm.

12. The polarization-maintaining very large mode area (PM VLMA) amplifier of claim 8, wherein the pump laser is a Raman fiber laser.

13. The polarization-maintaining very large mode area (PM VLMA) amplifier of claim 12, wherein Raman fiber laser produces up to 20 W output power at 1480 nm.

14. The polarization-maintaining very large mode area (PM VLMA) amplifier of claim 13, further including the output end of the optical fiber terminated with an 800 μm long coreless fiber that was angle polished at 8 degrees.

15. The polarization-maintaining very large mode area (PM VLMA) amplifier of claim 14, further including
   a. an 11 mm focal length lens through which the signal light exiting the output end of the optical fiber passes through and is collimated by to form a collimated signal light; and
   b. a 1530 nm high-pass filter through which the collimated signal light passes to transmit the signal and reject unabsorbed 1480 nm pump and residual short-wavelength Stokes lines from the Raman laser.

* * * * *